US009618403B2

(12) United States Patent
Li et al.

(10) Patent No.: US 9,618,403 B2
(45) Date of Patent: Apr. 11, 2017

(54) STRAIN SENSORS AND METHODS OF MANUFACTURE AND USE

(71) Applicant: Florida State University Research Foundation, Inc., Tallahassee, FL (US)

(72) Inventors: Shu Li, Columbus, IN (US); Zhiyong Liang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 308 days.

(21) Appl. No.: 14/504,573

(22) Filed: Oct. 2, 2014

(65) Prior Publication Data
US 2016/0153762 A1    Jun. 2, 2016

Related U.S. Application Data

(60) Provisional application No. 61/885,782, filed on Oct. 2, 2013.

(51) Int. Cl.
*G01B 7/16* (2006.01)
*G01L 1/00* (2006.01)
(52) U.S. Cl.
CPC . *G01L 1/00* (2013.01); *G01B 7/18* (2013.01)
(58) Field of Classification Search
None
See application file for complete search history.

(56) References Cited

U.S. PATENT DOCUMENTS

| | | | |
|---|---|---|---|
| 7,611,579 B2 | 11/2009 | Lashmore et al. | |
| 8,427,811 B2 * | 4/2013 | Machida | H01G 9/016 361/502 |
| 8,943,897 B2 * | 2/2015 | Beauvais | A61B 5/1038 73/774 |
| 9,389,231 B2 * | 7/2016 | Edwards | G01N 33/56911 |
| 2004/0239475 A1 * | 12/2004 | Hermann | G01L 1/2293 338/25 |
| 2006/0118777 A1 * | 6/2006 | Hirakata | B82Y 10/00 257/39 |

(Continued)

OTHER PUBLICATIONS

Minot, E.D., et al., Tuning Carbon Nanotube Band Gaps with Strain, Physical Review Letters, 90, 156401, Apr. 15, 2003.

(Continued)

*Primary Examiner* — Peter Macchiarolo
*Assistant Examiner* — Jermaine Jenkins
(74) *Attorney, Agent, or Firm* — Eversheds Sutherland (US) LLP (57) ABSTRACT

Strain sensors are provided that include a flexible substrate, a sheet affixed to the flexible substrate, and two or more microelectrodes printed at spaced locations onto either the sheet or the flexible substrate, wherein the sheet includes a carbon nanotube network, the sheet having a top side and an opposing second side. The two or more microelectrodes are printed at spaced locations onto the top side of the sheet or onto a side of the flexible substrate facing the second side of the sheet. Methods are provided for fabricating a strain sensor wherein the sheet is arranged between the printed microelectrodes and the flexible substrate or wherein the second side of the sheet is arranged atop or across the printed microelectrodes. Methods are also provided for measuring strain in a structure via the strain sensors affixed or integrated therein.

22 Claims, 9 Drawing Sheets

(56) References Cited

U.S. PATENT DOCUMENTS

| | | | | |
|---|---|---|---|---|
| 2007/0222472 A1* | 9/2007 | Raravikar | ............... | B82Y 10/00 73/774 |
| 2011/0147715 A1* | 6/2011 | Rogers | ................... | B82Y 10/00 257/24 |
| 2012/0282453 A1* | 11/2012 | Wang | ....................... | B29C 70/62 428/299.1 |
| 2012/0312102 A1* | 12/2012 | alvarez | ............... | E21B 33/1208 73/862.041 |
| 2014/0331793 A1* | 11/2014 | Suzuki | ................... | B82Y 30/00 73/862.629 |

OTHER PUBLICATIONS

Maki, H.; et al., "Direct Observation of the Deformation and the Band Gap Change from an Individual Single-Walled Carbon Nanotube under Uniaxial Strain", Nano Letters 7, Mar. 15, 2007, pp. 890-895.

Cao, J. et al., "Electromechanical Properties of Metallic, Quasimetallic, and Semiconducting Carbon Nanotubes Under Stretching", Physical Review Letters, 90, 157601, Apr. 18, 2003.

Grow, R.J., et al., "Piezoresistance of carbon nanotubes on deformable thin-film membranes", Applied Physics Letters 86, 093104-3, 2005.

Stampfer, C., et al. "Nano-Electrochemical Displacement Sensing Based on Single-Walled Carbon Nanotubes", Nano Letters, 6, Jun. 17, 2006, pp. 1449-1453.

Su, C.C., et al., "Two dimensional carbon nanotube based strain sensor", Sensors and Actuators A: Physical, vol. 176, Apr. 2012, pp. 124-129.

Kang, I., et al., "A carbon nanotube strain sensor for structural health monitoring", Smart Materials and Structures vol. 15, No. 3, Apr. 25, 2006, pp. 737-748.

Thostenson, E., at al., "Carbon Nanotube Networks: Sensing of Distributed Strain and Damage for Life Prediction and Self Healing", Advanced Materials, vol. 18, Issue 21, Nov. 2006, pp. 2837-2841.

Pham, G.T., et al., "Processing and modeling of conductive thermoplastic/carbon nanotube films for strain sensing", Composites Part B: Engineering, vol. 39, Issue 1, Jan. 2008, pp. 209-216.

Hu, N., et al. "Tunneling effect in a polymer/carbon nanotube nanocomposite strain sensor", Acta Materialia, vol. 56, Issue 13, Aug. 2008, pp. 2929-2936.

Hu, N., et al., "Investigation on sensitivity of a polymer/carbon nanotube composite strain sensor", Carbon, vol. 48, Issue 3, Mar. 2010, pp. 680-687.

Bauhofer, W., et al., "A review and analysis of electrical percolation in carbon nanotube polymer composites", Composites Science and Technology, vol. 69, Issue 10, Aug. 2009, pp. 1486-1498.

Schadler, L.S., et al. "Load Transfer in Carbon Nanotube Epoxy Composites", Applied Physics Letters 73, 1998, pp. 3842-3844.

Baughman, R.H. et al., "Carbon tube actuators", Science, 284, 1999, pp. 1340-1344.

Huang, Y. et al. "Design and Fabrication of Single-Walled Carbon Nanonet Flexible Strain Sensors", Sensors 12, 2012, pp. 3269-3280.

Yamada, T. et al., "A stretchable carbon nanotube strain sensor for human-motion detection", Nature Nanotechnology 6, 2011, pp. 296-301.

Zhao, H. et al., "Carbon nanotube yarn strain sensors", Nanotechnology 21, 2010, 305502.

Cheng, Q. et al., "High Mechanical Performance Composite Conductor: Multi-Walled Carbon Nanotube Sheet/Bismaleimide Nanocomposites", Advanced Functional Materials, vol. 19, Issue 20, 2009 Oct. 23, pp. 3219-3225.

Li, S. et al., "In Situ characterization of structural changes and the fraction of aligned carbon nanotube networks produced by stretching", Carbon, vol. 50, Issue 10, Aug. 2012, pp. 3859-3867.

Ghatak, S. et al., "Electrical Conductivity, Magnetoconductivity and Dielectric Behaviour of (Mg,Ni)-Ferrite below Room Temperature", Materials Sciences and Applications 1, 2010, pp. 177-186.

Wu, A. et al., "Strain Rate-Dependent Tensile Properties and Dynamic Electromechanical Response of Carbon Nanotube Fibers", Carbon 50, 2012, pp. 3876-3881.

Dohn, S. et al., "Multi-walled carbon nanotubes integrated in microcantilevers for application of tensile strain", Ultramicroscopy 105, 2005, pp. 209-214.

Collins, P.G. et al., "Current Saturation and Electrical Breakdown in Multiwalled Carbon Nanotubes", Physical Review Letters, vol. 86, Issue 14, 2001, pp. 3128-3131.

Xie, B. et al., "Mechanics of carbon nanotube networks: microstructural evolution and optimal design", Soft Matter, Issue 21, 2011, pp. 10039-10047.

* cited by examiner

STRAIN SENSORS AND METHODS OF MANUFACTURE AND USE

CROSS-REFERENCE TO RELATED APPLICATIONS

This application claims priority to U.S. Provisional Application No. 61/885,782, filed Oct. 2, 2013, which is incorporated herein by reference.

TECHNICAL FIELD

The present disclosure is generally in the field of sensors and sensor systems, and more particularly strain sensors, which, for example, may be readily amenable to large-scale manufacture.

BACKGROUND

Strain sensors are devices that measure strain in an object subjected to external forces. For some relatively large structures, it may be desirable to array several strain sensors across the body of the structure.

Conventional, commercially available strain gauge sensors typically use metal foil sensing elements on flexible substrates that are suitable for large-scale manufacturing. In use, these sensors are attached to an object, and as the object is deformed, the foil element of the sensor is deformed, causing a change in its electrical resistance. This resistance change is related to the strain of the object by the quantity known as the gauge factor. The gauge factor of these conventional sensors, however, is generally limited to about 2. The gauge factor of strain sensors is an index of the strain sensitivity of the gauge. The higher the gauge factor, the more sensitive the gauge and the greater the electrical output for indication or recording purposes. It would be desirable to provide strain gauges with greater gauge factor and sensitivity.

Individual nanotube-based strain sensors have been made that have gauge factors of up to 2,900. However, these are not readily scalable for mass production, and their usefulness is substantially limited by the nanoscale size of the sensing element. Incorporating these nanoscale devices into engineering applications to take full advantage of the intrinsic piezoresistive properties of carbon nanotubes (CNTs) remains a challenge. High precision fabrication processes are needed to make these sensors, and the processes do not readily lend themselves to scale up for mass manufacture of the devices.

Nanocomposite-based strain sensors also have been made. One approach includes dispersing nanotubes into a resin matrix to form electrically conductive composites. Gauge factors of up to 22.4 have been reported for these types of nanocomposite sensors. However, the sensitivity is highly dependent on the percolation threshold, which is mainly determined by the nanotube aspect ratio and dispersion. Achieving the uniformity needed for sensing elements when mixing CNTs with resin remains a challenge, because of the tendency of CNTs to aggregate and because of poor interfacial bonding between nanotubes and the resin. Accordingly, the manufacture of these sensors requires dispersion of the nanotubes around the percolation threshold, and is thus unsuitable for scalable manufacturing.

In terms of the potential for scalable manufacturability, free standing carbon nanotube networks (CNTNs) formed through either filtration/evaporation of nanotube suspension or condensing of nanotube aero-gel is thus more desirable serving the purpose of macroscopic sensing elements. However, since these networks are typically packed at the densities far exceeding the percolation threshold, the sensitivity is usually inferior to their percolating counterparts. The gauge factors of CNTN-based strain sensors were reported to be up to 7 for single-walled carbon nanotube (SWCNT) networks, 8 and 3.76 for multi-walled carbon nanotube (MWCNT) networks in small strain ranges. For large strain ranges, layers of CNTNs were laid up side by side to form a layered structure that was reported to sense strains up to 280% at the gauge factor of 0.82. Nanotube yarns formed with twisted MWCNT networks were reported to exhibit even more reduced gauge factor of ~0.5.

It therefore would be desirable to provide improved strain sensors that overcome one or more of the foregoing limitations.

SUMMARY

In one aspect, a strain sensor is provided. The sensor includes a flexible substrate, a sheet comprising a carbon nanotube network, and two or more microelectrodes. The sheet is affixed to the flexible substrate, the sheet having a top side and an opposing second side. The two or more microelectrodes are printed at spaced locations onto either the top side of the sheet, such that the sheet is arranged between the printed microelectrodes and the flexible substrate, or a side of the flexible substrate facing the second side of the sheet, such that the printed microelectrodes are between the second side of the sheet and the flexible substrate.

In another aspect, methods are provided for fabricating a strain sensor. In one embodiment, the method includes bonding a sheet comprising a carbon nanotube network to a flexible substrate, the sheet having a top side and an opposing second side; and printing two or more microelectrodes at spaced locations onto the top side of the sheet, wherein the sheet is arranged between the printed microelectrodes and the flexible substrate. In another embodiment the method includes printing two or more microelectrodes at spaced locations onto a flexible substrate; and bonding a sheet that includes a carbon nanotube network to the flexible substrate, the sheet having a top side and an opposing second side, wherein the second side of the sheet is arranged atop or across the printed microelectrodes.

In yet another aspect, methods are provided for measuring strain in a structure using the strain sensors. In one embodiment, the method includes subjecting the structure, which has at least one the strain sensors affixed thereon or integrated therein, to external forces effective to induce strain in the structure; detecting a change in electrical resistance of the strain sensor, wherein the change is generated and transferred as an output voltage signal; and determining, from the output voltage signal, the strain in the structure caused by the external forces.

DETAILED DESCRIPTION

Strain sensors have been developed that are based on carbon nanotube networks. These strain sensors have a higher gauge factor, and thus higher sensitivity, compared to conventional strain sensors, e.g., a metal foil based strain sensor. In addition, the strain sensors as described herein include a flexible substrate in which a sheet of the carbon nanotube network is affixed and two or more microelectrodes, thereby advantageously providing strain sensors that are suitable for large scale manufacturing. These features of the sensors beneficially enable high performance and flexible nature sensors, and mitigate or eliminate current limitations involving scalable manufacturing of carbon-nanotube based sensors.

In embodiments, the strain sensor includes a flexible substrate, a sheet including a carbon nanotube network that is affixed to the flexible substrate, and two or more microelectrodes. As used herein, a carbon nanotube network (CNTN) may include single-walled carbon nanotubes, multi-walled carbon nanotubes, carbon nanofibers, or a combination thereof. In one embodiment, the carbon nanotube network is a buckypaper.

Generally, both the positive and negative gauge factors produced by the strain sensors described herein are one order of magnitude higher than current commercial strain gauge sensors. The methods for manufacturing the strains sensors described herein also may be advantageous because such methods demonstrate the capability of scaling-up the manufacturing of the sensors. This may be due to the fact that nanotube sheets are used and nanotube sheets can be continuously manufactured.

Figure 1:
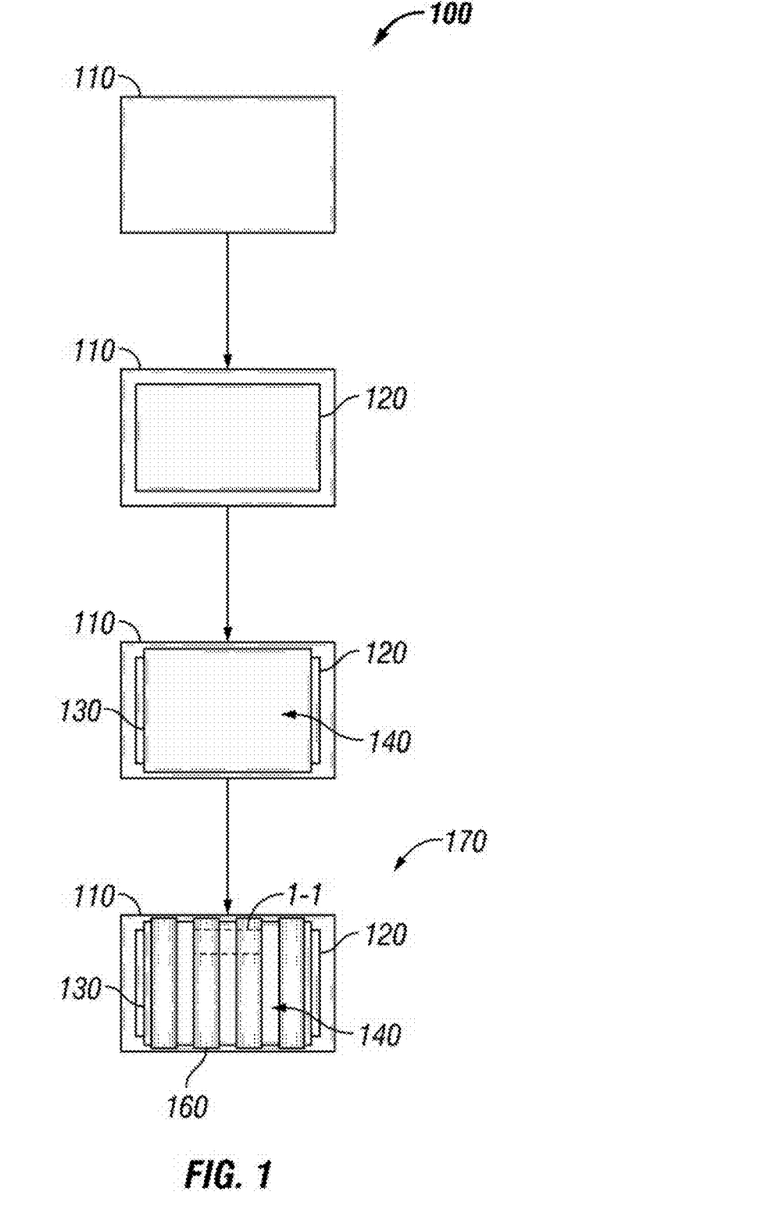
FIG. 1 is a schematic flow diagram that illustrates fabrication of a strain sensor (Type A) in accordance with an embodiment of the present disclosure.
Figure 1A:
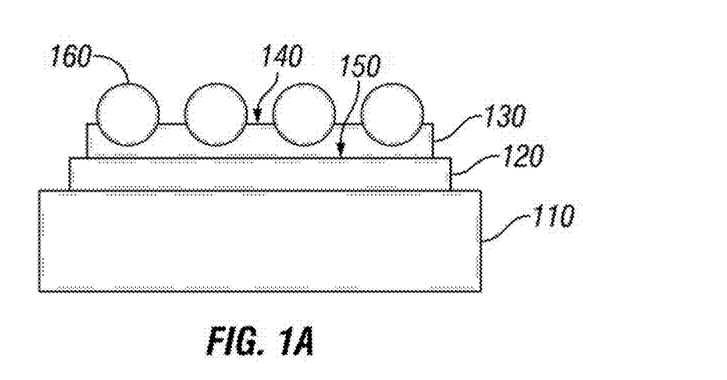
FIG. 1A is a cross-sectional view of the strain sensor fabricated in FIG. 1 in accordance with an embodiment of the present disclosure.
Figure 4:
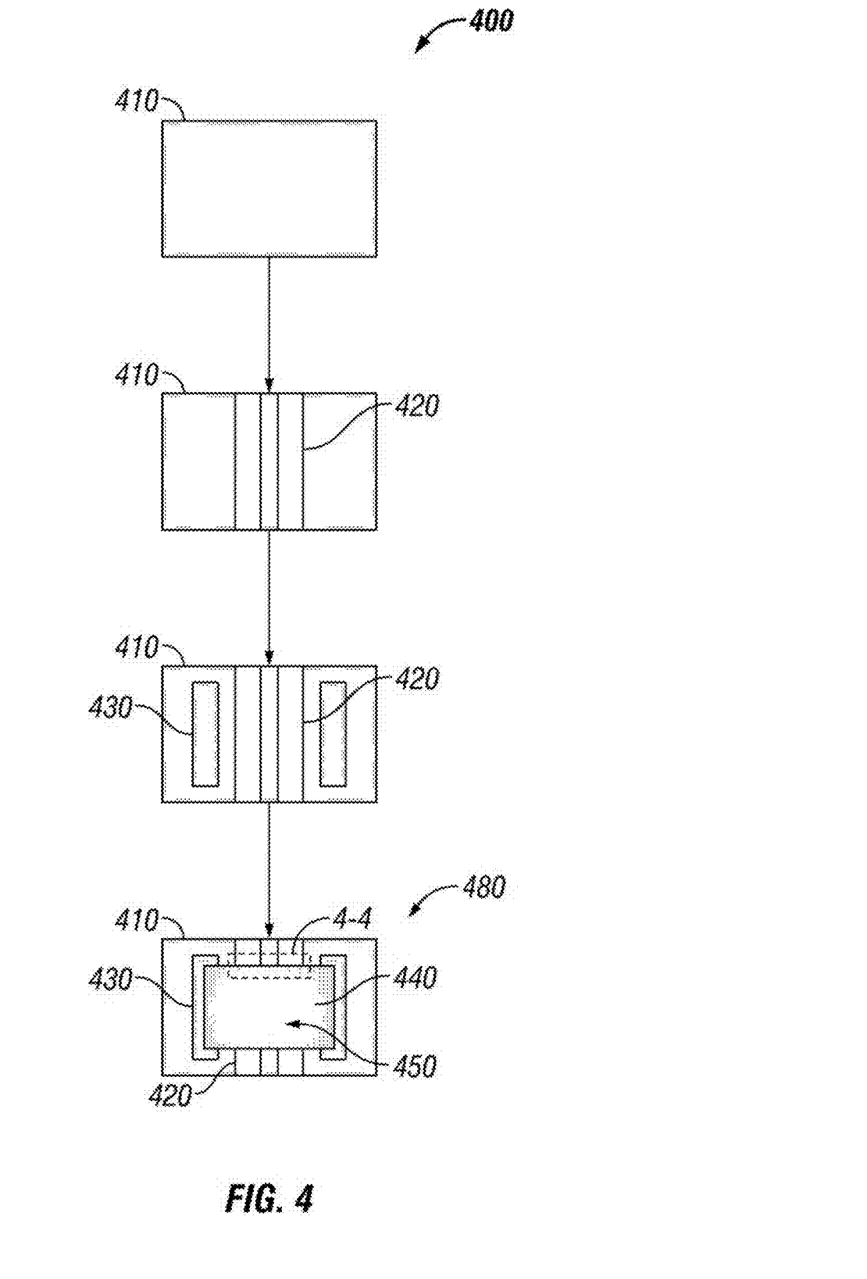
FIG. 4 is a schematic flow diagram that illustrates fabrication of a strain sensor (Type B) in accordance with an embodiment of the present disclosure.
Figure 4A:
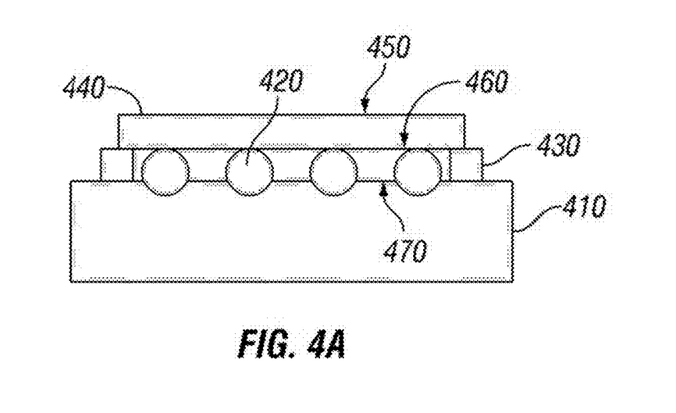
FIG. 4A is a cross-sectional view of the strain sensor fabricated in FIG. 4 in accordance with an embodiment of the present disclosure.
Figure 4B:
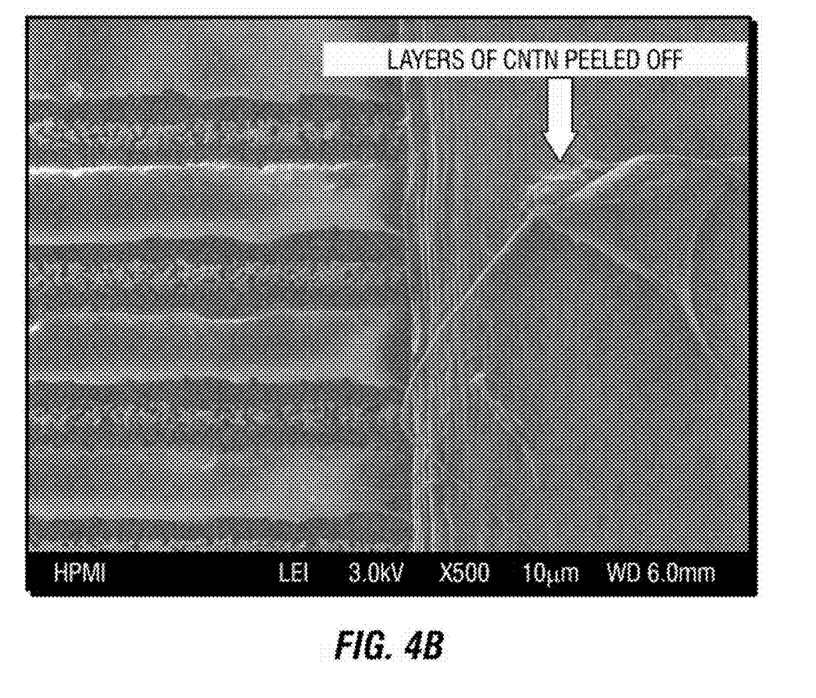
FIG. 4B is a SEM of a sectional view of the strain sensor fabricated in FIG. 4 taken on area 4-4.

Examples of strain sensors described herein are shown in FIGS. 1 and 1A and FIGS. 4 and 4A. In embodiments, the two or more microelectrodes are printed at spaced locations onto either the sheet, as illustrated in FIG. 1 and FIG. 1A, or the flexible substrate, as illustrated in FIG. 4 and FIG. 4A. The phrase "spaced locations" refers to locations discrete from one another and in electrical contact with the sheet to permit electric current flow across the CNTN, wherein the electrodes are positioned from one another a distance effective to detect a variation in measured resistance as the sheet is deformed. In some embodiments, the spaced locations are spaced about 30 µm to about 1cm from each other. In a preferred embodiment, the locations of the electrodes (i.e., the spaced locations) are spaced from about 1 µm to about 50 µm. In a preferred embodiment, the width of each of the printed electrodes is from about 5 µm to about 1 mm.

In some embodiments, the CNTs in the carbon nanotube network are substantially aligned.

In some embodiments, the sheet is affixed to the substrate with an epoxy resin that is interposed between the sheet and the flexible substrate. The flexible substrate may be formed of a variety of suitable materials. Examples include polyimide, polyethylene terephthalate (PET), polybutylene terephthalate (PBT), polycarbonate (PC), or any combination thereof.

In further embodiments, the two or more microelectrodes may be produced by aerosol jet printing. Aerosol jet printing may be advantageous because such printing is capable of streamlining the electrode fabrication with the high precision required for the sensing mechanism to function, thereby further enhancing the capability of scaling-up the manufacturing of the strain sensors described herein.

Two types of sensing devices were demonstrated through different designs in the fabrication process, and the methods for making each of these types of sensors, for example FIG. 1 and FIG. 1A (Type A strain sensor) and FIG. 4 and FIG. 4A (Type B strain sensor). These embodiments were found to demonstrate the potential and feasibility of modulating sensor performance by simply altering the fabrication process. In addition, these embodiments, via the combination of using preformed carbon nanotube networks and printed microelectrodes, were found to exhibit the potential for large-scale sensor manufacturing.

Type A Strain Sensors

FIGS. 1 and 1A depict a Type A strain sensor according to the present teachings. In a preferred embodiment, a Type A strain sensor 170 includes a sheet 130 which is affixed to a flexible substrate 110. The sheet has a top side 140 and an opposing second side 150. The sensor 170 also includes two or more microelectrodes 160 that are printed onto the top side 140 of the sheet 130. In a preferred embodiment, the sheet 130 is affixed to the substrate 110 with an epoxy resin 120 that is interposed between the opposing second side 150 of the sheet 130 and the flexible substrate 110. In such embodiments, the strain sensor may yield a positive gauge factor of about 6 to about 20. In a preferred embodiment, the strain sensor advantageously yields a positive gauge factor that is greater than 10.

Figure 1B:
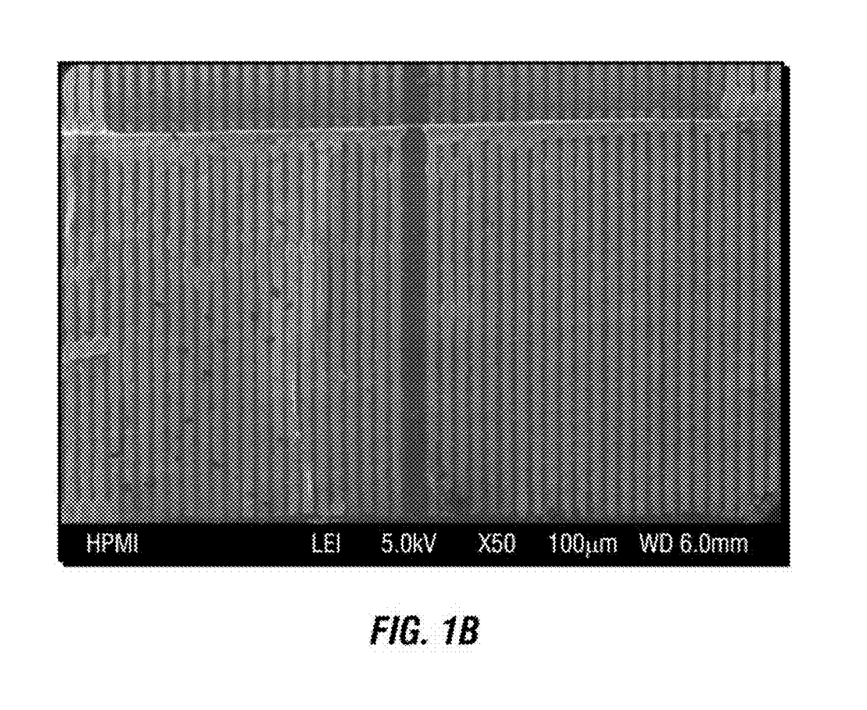
FIG. 1B is a scanning electron micrograph (SEM) of a sectional view of the strain sensor fabricated in FIG. 1 taken on area 1-1.

In one embodiment, the method for making a Type A strain sensor may include bonding a sheet comprising a carbon nanotube network to a flexible substrate, the sheet having a top side and an opposing second side; and printing two or more microelectrodes at spaced locations onto a top side of the sheet, wherein the sheet is arranged between the printed microelectrodes and the flexible substrate. In some embodiments, the step of printing electrodes includes aerosel jet printing of the electrodes. In other embodiments, the spaced locations are spaced about 30 µm to 1 cm from each other. For example, FIG. 1B shows 1 mm wide electrodes printed onto the CNTN with 100 µm spacing from each other.

In a preferred embodiment, as illustrated in FIG. 1, the method 100 for making a Type A strain sensor 170 includes bonding the sheet 130 with an epoxy resin 120 to the flexible substrate 110, and printing the microelectrodes 160 at spaced locations onto the top side 140 of the sheet 130, wherein the epoxy resin 120 is interposed between the opposing second side 150 of the sheet 130 and the flexible substrate 110.

Type B Strain Sensors

FIGS. 4 and 4A depict a Type B strain sensor according to the present teachings. In a preferred embodiment, a Type B strain sensor 480 includes a sheet 440 which is affixed to a flexible substrate 410. The sheet has a top side 450 and an opposing second side 460. The sensor 480 also includes two or more microelectrodes 420 that are printed on a side 470 of the flexible sheet 410 that faces the opposing second side 460 of the sheet 440, such that the printed microelectrodes 420 are between the opposing second side 460 of the sheet 440 and the flexible substrate 410. In a preferred embodiment, the sheet 440 is affixed to the substrate with an epoxy resin 430. In such embodiments, the strain sensor may yield a negative gauge factor of about 15 to about 40. In a preferred embodiment, the strain sensor advantageously yields a negative gauge factor that is greater than 15.

In one embodiment, the method for making a Type B strain sensor includes printing two or more microelectrodes at spaced locations onto a flexible substrate; and bonding a sheet comprising a carbon nanotube network to the flexible substrate, the sheet having a top side and an opposing second side, wherein the opposing second side of the sheet is arranged atop or across the printed microelectrodes. In some embodiments, the step of printing electrodes includes aerosel jet printing of the electrodes. In some embodiments, the printed electrodes are spaced from about 30 µm to 1 cm from each other.

In a preferred embodiment, as illustrated in FIG. 4, the method 400 for making a Type B strain sensor 480 includes printing the microelectrodes 420 at spaced locations onto the flexible substrate 410, and bonding the sheet 440 with an epoxy resin 430 to the flexible substrate 410, wherein the epoxy resin 430 is interposed between the opposing second side 460 of the sheet 440 and the flexible substrate 410. In this embodiment, no epoxy resin 430 is used to secure the CNTN onto the electrodes, thus the quality of the contact is solely dependent on the physical proximity and interactions between nanotubes and the electrodes.

It was found that the stretch-induced alignment of CNTNs is a factor in the functioning of such sensing mechanisms. Among Type B strain sensors made with aligned and random CNTNs, only the aligned CNTNs demonstrated electromechanical response within the small strain range that was tested of up to 1%. Random CNTNs generally were too porous and the inhomogeneity of the voids prohibited the same sensing mechanism to function. This is in agreement with previous studies on the effect of stretch-induced alignment. It has been well evidenced from X-ray and Raman spectra analysis results that during stretching, alignment of CNTs is improved and becomes more of a graphite crystal packing Such graphite crystal-like packing of CNTs substantially enhances long range order of CNT networks and therefore reduces voids in CNT networks.

Uses of Strain Sensors

The strain sensors described herein may be used in a wide variety of applications, including aeronautical structures, including aircraft, spacecraft, surface and subsurface ships, missiles, and the like.

In use, the strain sensors described herein may be used measure the linear deformation (mechanical surface strain) occurring in a material during loading. In embodiments, the strain sensors generally operate by flow of an AC or DC electrical current through the CNTN via the two or more microelectrodes printed on either the sheet that includes the CNTN (i.e., Type A strain sensors) or the flexible substrate in which the sheet is affixed to (i.e., Type B strain sensors). The sensor detects and measures a voltage change due to the resistance change caused by deformation during loading of the object the sensor is affixed. In addition to their fundamental use for measuring strain, strain sensors may also be used for indirectly measuring other physical parameters of a structure, including but not limited to pressure, displacement, torque, etc. by employing such sensors in other measure systems. Non-limiting examples of such systems include pressure transducers, load cells, displacement measuring devices, accelerometer, position sensors, and stress-strain systems.

In one embodiment, a method is provided for measuring strain in a structure which has at least one strain sensor as described herein affixed onto or integrated into the structure. The method includes (i) detecting a change in electrical resistance of the at least one strain sensor, when the structure is subjected to a change in external forces effective to induce strain in the structure, wherein the electrical resistance change is generated and transferred as an output voltage signal; and (ii) determining, from the output voltage signal, the strain in the structure caused by the external forces.

In one embodiment, the strain sensor includes (i) a flexible substrate, (ii) a sheet that includes a carbon nanotube network affixed to the flexible substrate, wherein the sheet has a top side and an opposing second side, and (iii) two or more microelectrodes printed at spaced locations onto the top side of the sheet, such that the sheet is arranged between the printed microelectrodes and the flexible substrate. In such an embodiment, the strain senor may yield a positive gauge factor of about 6 to about 20.

In another embodiment, the strain sensor includes a flexible substrate, a sheet comprising a carbon nanotube network affixed to the flexible substrate, the sheet having a top side and an opposing second side, and two or more microelectrodes printed at spaced locations onto a side of the flexible substrate facing the opposing second side of the sheet, such that the printed microelectrodes are between the opposing second side of the sheet and the flexible substrate. In such an embodiment, the strain sensor may yield a negative gauge factor of about 15 to about 40.

The strain sensors described herein are generally part of a system that includes other electrical components for operation. Non-limiting examples include suitable power sources, data acquisition modules, processors, microcontroller, and the like.

The strain sensors and method may be further understood with the following non-limiting examples.

Two types of sensors were manufactured, i.e., Type A strain sensors and Type B strain sensors. It was found that Type A and B strain sensors achieved positive and negative gauge factors up to 20 and 40 in magnitude, respectively. The high performance and flexible nature of these strain sensors, as well as their capability for scalable manufacturing processes, exhibited promising application potentials.

Example 1—Fabrication of Type A Strain Sensors

Carbon nanotube network sheets were prepared that included randomly dispersed MWCNTs supplied by Nanocomp Technologies, Inc. The sheets were stretched to 40% strains on a Shimadzu AGS-J machine forming aligned CNTNs.

The aligned CNTNs were attached to the DuPont Kapton FPC polyimide film (1 cm×2 cm) using 635 low viscosity Bisphenol-A based epoxy resin mixed with the medium epoxy hardener (US Composites, USA) at 3:1 ratio. A hot press molding process was used for the curing. Silver nanoparticle ink (Cabot Corporation, USA) was then printed on top of CNTN sheets using an Optomec M3D Aerosol Jet printing system, forming four Type A sensor samples with 1 mm wide electrodes. To help better elucidate the sensing mechanism, Samples 1, 2, and 3 were fabricated with printed electrodes having 100 µm spacings, whereas the spacings of sample 4 were increased to ~1 cm. The printed sensors were placed in a Thermo Scientific Lindberg/Blue M tube furnace at 350° C. for 30 min to sinter silver nanoparticles to enhance the electrical conductivity.

Four Type A samples were fabricated by printing the electrodes onto the CNTN sheets. To help better elucidate the sensing mechanism, Samples 1, 2, and 3 were fabricated with printed electrodes with 100 µm spacings (e.g., as shown in FIG. 1B), whereas the spacings of sample 4 were increased to ∥1 cm.

Example 2—Performance of Type A Strain Sensors

Polycarbonate films of 7 mm in thickness (McMaster, USA) were cut into dogbone-shaped specimens on an OMAX waterjet cutter following ASTM D 638 standard with a gauge length of 57 mm. The four Type A sensor samples, as fabricated in Example 1, were attached to the specimens using the same epoxy resin system, and the sandwiched structures were enclosed in vacuum bagging and cured at 150° C. for two hours. The specimens were then loaded on to the Shimadzu AGS-J machine. A Keithley 6221 AC and DC current source and 2182A nanovoltmeter were used to monitor the resistance change of the strain sensors using a four-probe force current measure voltage scheme. The electrical leads were interfaced to the printed electrodes through copper toothless alligator clips attached using silver paste. The strain ratio was recorded by a Shimadzu non-contact video extensometer DVE-201. For comparison with commercial strain gauge performance, bonded resistance strain gauges with linear grid pattern (Vishay Micro-Measurements, USA) were also tested side by side. The sensor performance results of the four Type A strain sensors are shown in FIGS. 2A-2D, in which the black solid squares represent the strain readings from the video extensometer, the solid circles represent the ΔR/R in percentage of the Type A sensors, and the hollow squares represent the ΔR/R in percentage of commercial strain gauges, with the corresponding second y-axis in the middle of the graph.

Two types of contact resistances were expected to dominate the piezoresistive behavior of the carbon nanotube network of the Type A strain sensors: 1) the change of the intrinsic resistances of CNTs within individual nanotube bundles in response to the strains applied; and 2) the change of interbundle resistances that arose from the structural changes of the networks under strains. While both mechanisms contribute to the overall piezoresistive properties of CNTNs, the modulation of the intrinsic resistance of CNTs was expected to yield higher ΔR/R (where R is the initial resistance of the sensing element, and ΔR is the change in its resistance in response to applied strains) due to large resistance changes from CNT deformation. When the spacing between electrodes is reduced, the channel length of the device is effectively reduced from the length of the whole network to individual CNT bundle lengths. Conduction through the channel would have less tunneling between the CNT bundles, resulting in intrinsic resistances of CNTs within bundles being measured.

Samples 1, 2, and 3 were created with shortened channel lengths via printing the electrodes 100 µm from each other. The electrodes were 1 mm wide, formed with multiple paths of 30-50 µm wide print lines. Although the paths were discrete, the print lines constituent of the electrodes were shorted when they were interfaced to the alligator clip with silver adhesive. So from the perspective of the current source and voltmeter, these adjacent discrete lines still form an integral electrode. The spacings were expected to be smaller than the average length of the constituent nanotube bundles in the CNTN, thus at least a fraction of the highly aligned bundles could form direct current paths across the adjacent inner between two electrodes. As the network was strained, both inter- and intra-bundle contact resistances would increase, but the narrowly spaced electrodes dictated that the measurements were dominated by the latter one.

Samples 1 and 2 (FIG. 2A and FIG. 2B) demonstrated gauge factors ~6 corresponding to the electromechanical response reported of similar long MWCNT fibers and were twice that of CNTNs formed with randomly oriented MWCNTs. Even higher gauge factors could be achieved, as sample 3 (FIG. 2C) reached 40% increase in resistance at a 0.5% strain, indicating the potential of reaching a gauge factor of 80. The gauge factors of the three samples are in good agreement with the range of gauge factor as predicted theoretically by modeling an individual MWCNT as a resistor network.

Sample 3 (FIG. 2C), however, did not respond to strains greater than 0.5%. The sample went through 70 cycles, and the pattern remained as shown in FIG. 3. While the ΔR maintained, the baseline shifted ~8%. The phenomenon may be explained by slippage of nanotube bundles under cyclic strains. As the strain increased to more than 0.5%, the bundle that conducted current across the inner two electrodes slipped and would not respond to further strains. During the cycling tests, such slippage worsened the contacts between the printed electrodes and the bundle, increasing the measured resistance, yet still maintaining the measured gauge factors, because for each cycle the increase in contact resistance remained constant.

In sample 4 (FIG. 2D), as the spacing between electrodes was increased to ~1 cm, it was expected that the inter-bundle contact resistances would dominate the conduction of the network, and thus decrease the sensitivity. Surprisingly, sample 4 achieved gauge factors up to 20. Further analysis of the network structure revealed that the CNT bundles in the aligned CNTNs were even longer than expected, reaching the centimeter scale. It is believed that the self-assembly of nanotubes during the stretch-induced alignment contributed to the extended lengths of the bundles.

Example 3—Fabrication of Type B Sensors

In a reverse process, the electrodes were first printed directly on the polyimide substrate (1 cm×2 cm) to obtain straight and solid lines. Two batches of electrode designs were printed. For Batch I, the electrodes were ~80 µm in width with ~50 µm spacing from each other; For Batch II, the electrodes were ~30 µm in width with ~30 µm spacing. The structure was also subjected to the sintering process before subsequent procedures.

A carbon nanotube network sheet was prepared that included randomly dispersed MWCNTs supplied by Nanocomp Technologies, Inc. The sheet was stretched to 40% strains on a Shimadzu AGS-J machine forming an aligned CNTN.

Three samples of Type B sensors were fabricated by laying the CNTN sheet on top of the electrodes that were printed on the polyimide substrate. The CNTN was affixed on the substrate using 635 low viscosity Bisphenol-A based epoxy resin mixed with the medium epoxy hardener (US Composites, USA) at 3:1 ratio. A hot press molding process was used for the curing. Although the same thin epoxy system, as in Example 1, was used to attach the aligned CNTNs, the resin was applied on the substrate as two separate thin patches millimeters away from the electrodes. These measures were taken to avoid resin from affecting the electrical contact between the CNTNs and electrodes, while still securely attaching CNTNs on the polyimide film. This structural design allowed the contact resistance between layers of CNTNs and between CNTNs and electrodes to sense strains.

Example 4—Performance of Type B Sensors

Polycarbonate films 7 mm in thickness (McMaster, USA) were cut into dogbone-shaped specimens on an OMAX waterjet cutter following ASTM D 638 standard with a gauge length of 57 mm. The three Type B sensor samples, as fabricated in Example 3, were attached to the specimens using the same epoxy resin system, and the sandwiched structures were enclosed in vacuum bagging and cured at 150° C. for two hours. The specimens were then loaded on to the Shimadzu AGS-J machine. A Keithley 6221 AC and DC current source and 2182A nanovoltmeter were used to monitor the resistance change of the strain sensors using a four-probe force current measure voltage scheme. The electrical leads were interfaced to the printed electrodes through copper toothless alligator clips attached using silver paste. The strain ratio was recorded by a Shimadzu non-contact video extensometer DVE-201. For comparison with commercial strain gauge performance, bonded resistance strain gauges with linear grid pattern (Vishay Micro-Measurements, USA) were also tested side by side. The sensor performance results of the three Type B strain sensors are shown in FIGS. 5A-5C.

Figure 2A:
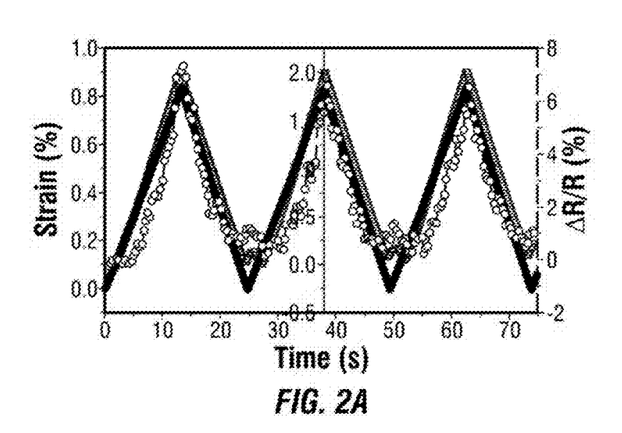
FIGS. 2A-2D are graphs comparing gauge factors (represented as percentage) of commercial strain gauges to Type A strain sensors in accordance with embodiments of the present disclosure.
Figure 2B:
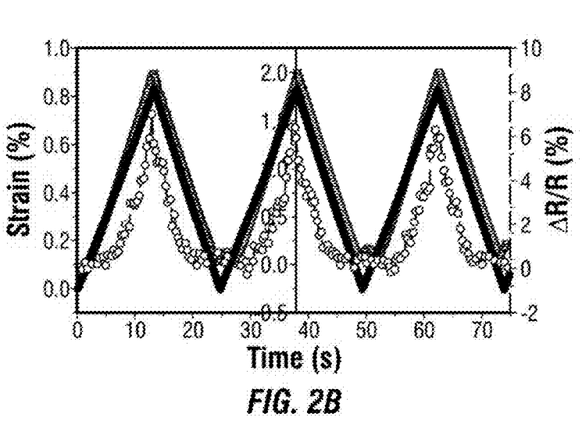
Figure 2C:
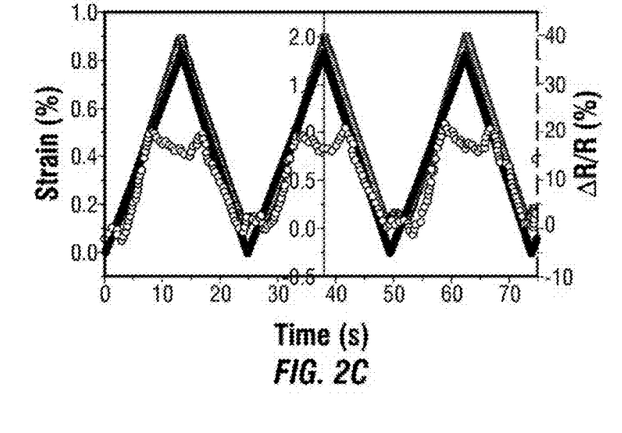
Figure 2D:
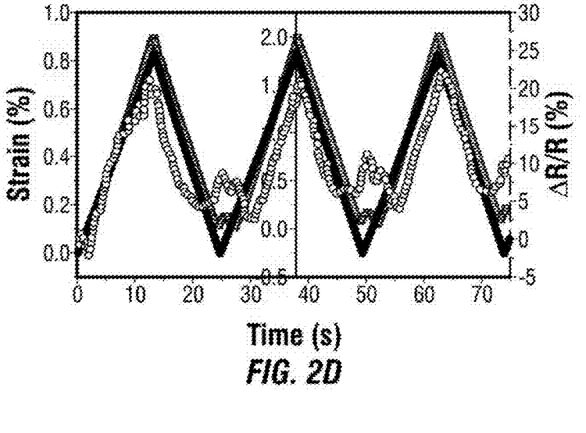
Figure 3:
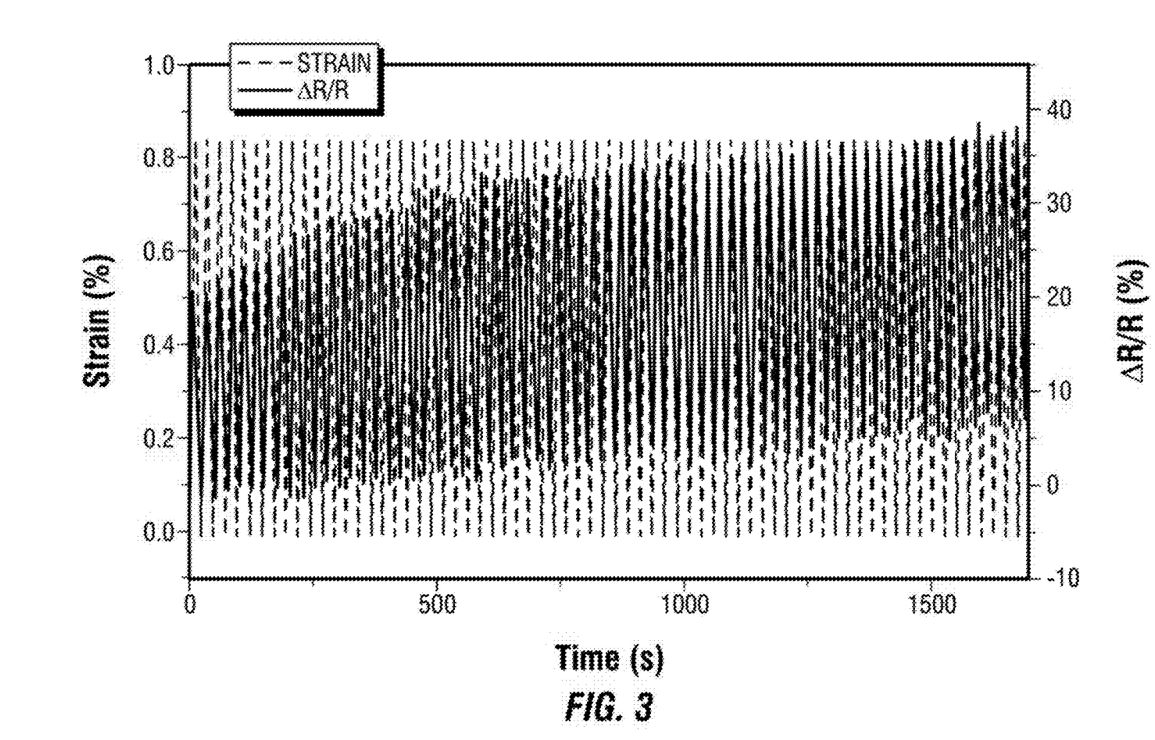
FIG. 3 is a graph depicting 70 cycles of repeatability testing of a Type A sensor in accordance with an embodiment of the present disclosure.

It was found that the soft, corrugated surface of the CNTN ensured electrical contact between the printed electrodes and the CNTs closest to the electrodes (i.e., the CNTs on the bottom of the CNTN), while the layered structure (as shown in FIG. 2C by the peeling) limited full participation of CNTs through the thickness of the CNTN. In other words, the electrical current had to go through a tortuous path within the CNTs closest to the electrodes, resulting in large initial resistances.

Figure 7A:
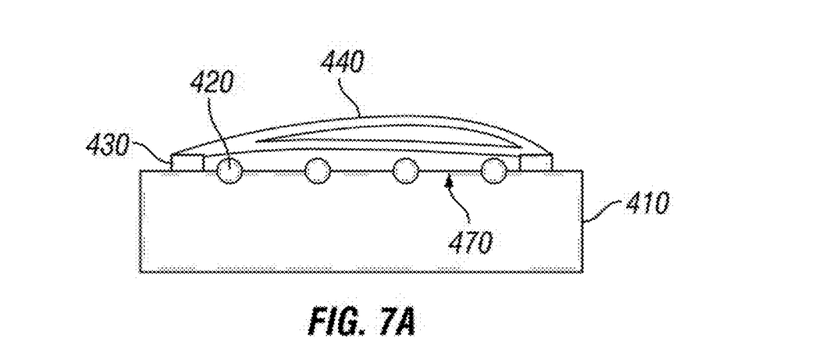
FIG. 7A is a cross-sectional view of a Type B strain sensor, prior to straining, in accordance with an embodiment of the present disclosure prior to straining.
Figure 7B:
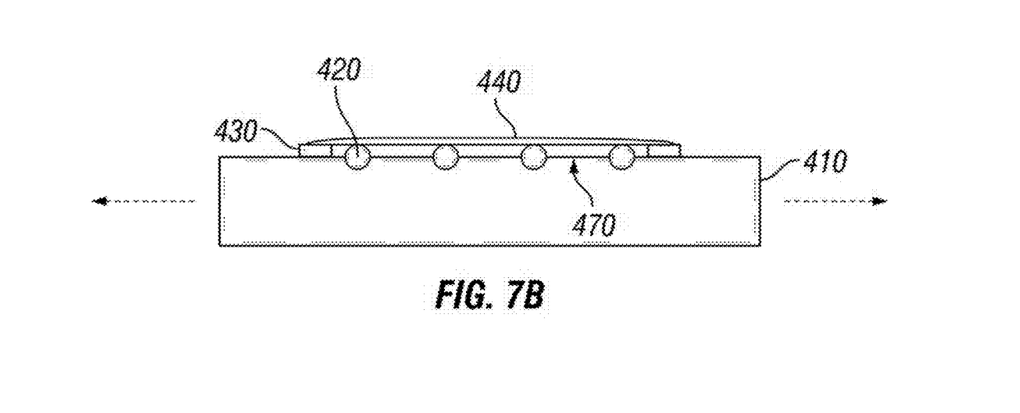
FIG. 7B is a cross-sectional view of the Type B strain sensor in FIG. 7A during straining.

However, by improving the contact between the CNTN and the electrodes (i.e., reducing the distances between layers through straining, as illustrated in FIGS. 7A and 7B), both contact resistances between the network and the electrodes, and the resistance of the CNTN decreased, which was reflected as the electromechanical behavior of the sensor.

Figure 5A:
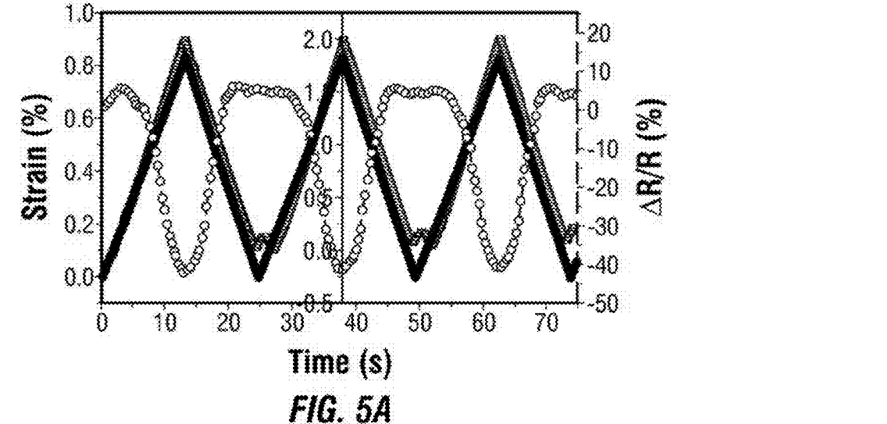
FIGS. 5A-5C are graphs comparing gauge factors (represented as percentage) of commercial strain gauges to Type B strain sensors in accordance with embodiments of the present disclosure.
Figure 5B:
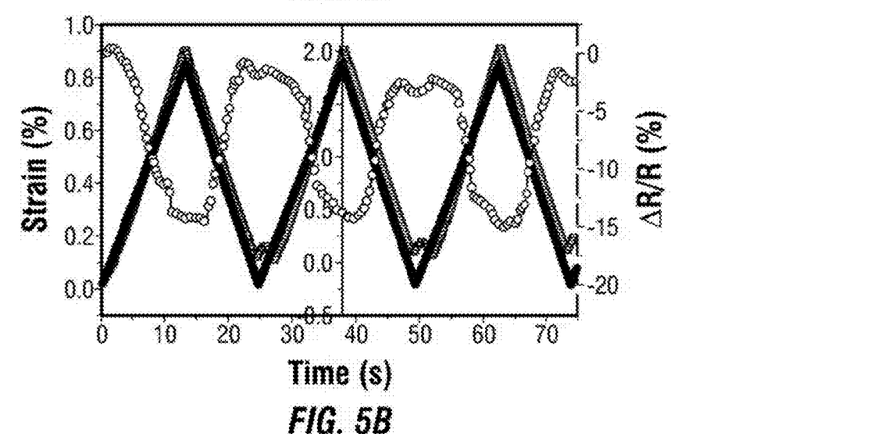
Figure 5C:
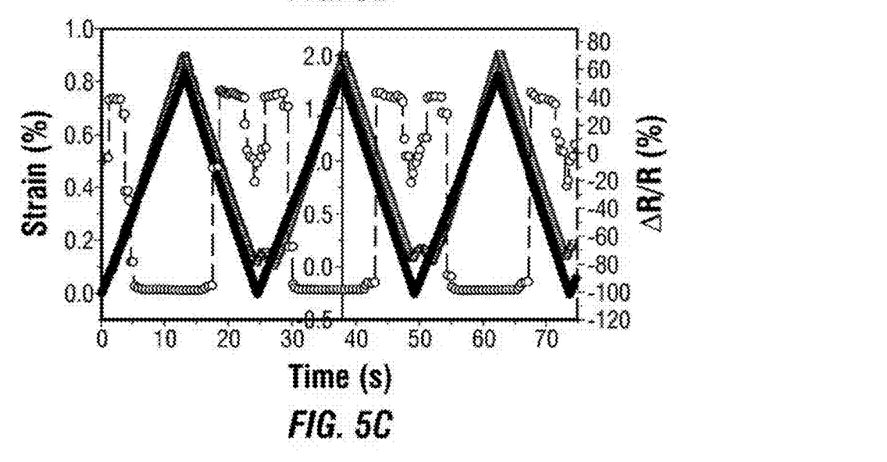

As shown in FIGS. 5A and 5B, the resistance dropped linearly with increasing strains, showing the strains allowed more CNTs within layers further away from the electrodes to be involved in the conduction. These two Type B sensors yielded gauge factors of −40 and −15, respectively. The response was highly sensitive to the fabrication process.

As shown in FIG. 5C, it is believed that the narrower electrodes made full contact for the CNTNs difficult at zero strain, thus the sensor behaved in the fashion of a switch because of the much higher initial resistance than other samples. The switch sensor might still find its niche of application, as it offered steep (more than 100%) drop in resistance when the strain was greater than 0.2%.

Figure 6:
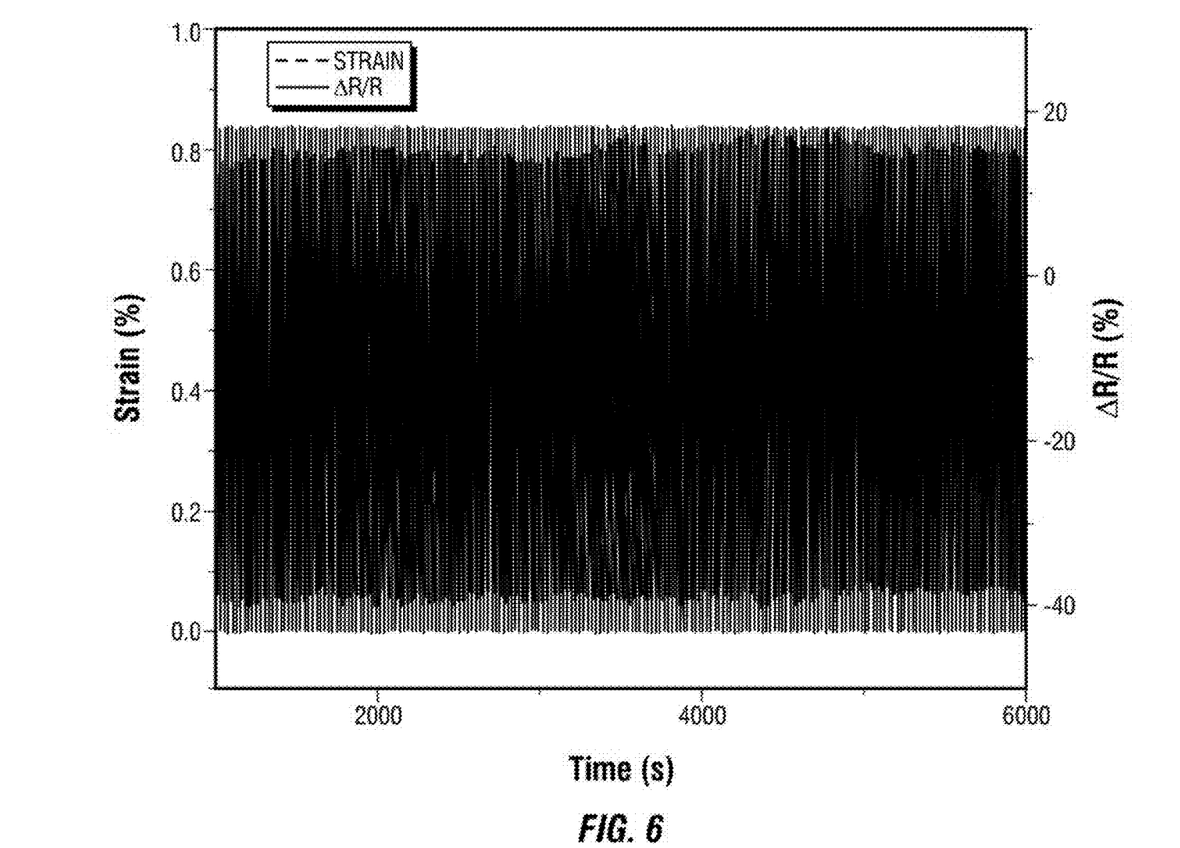
FIG. 6 is a graph depicting 500 cycles of repeatability testing of a Type B sensor in accordance with an embodiment of the present disclosure.

To verify the repeatability of such a contact-based sensing mechanism, sample 1 went through 500 cycles of repeatability testing. The results are shown in FIG. 6. The highly repeatable resistance change patterns demonstrate the feasibility of the sensing mechanism and verify that the contact change is not random.

It should be apparent that the foregoing relates only to certain embodiments of the present disclosure and that numerous changes and modifications may be made herein without departing from the spirit and the scope of the disclosure as defined by the following claims and equivalents thereof.

We claim:
1. A strain sensor comprising:
a flexible substrate;
a sheet which comprises a carbon nanotube network affixed to the flexible substrate, the sheet having a top side and an opposing second side; and
two or more microelectrodes printed at spaced locations directly onto:
(i) the top side of the sheet, such that the sheet is arranged between the printed microelectrodes and the flexible substrate; or
(ii) a side of the flexible substrate facing the second side of the sheet, such that the printed microelectrodes are between the second side of the sheet and the flexible substrate.
2. The strain sensor of claim 1, wherein the sheet is affixed to the substrate with an epoxy resin between the second side of the sheet and the flexible substrate.
3. The strain sensor of claim 1, wherein the substrate comprises a polyimide, polyethylene terephthalate, polybutylene terephthalate, polycarbonate, or a combination thereof.
4. The strain sensor of claim 1, wherein the carbon nanotube network comprises carbon nanotubes that are substantially aligned with one another.
5. The strain sensor of claim 1, wherein the microelectrodes are aerosol jet printed microelectrodes.
6. The strain sensor of claim 1, wherein the microelectrodes are printed at spaced locations directly onto the top side of the sheet, such that the sheet is between the printed microelectrodes and the flexible substrate.
7. The strain sensor of claim 6, wherein the strain sensor yields a positive gauge factor from about 6 to about 20.
8. The strain sensor of claim 1, wherein the microelectrodes are printed at spaced locations directly onto the side of the flexible substrate facing the second side of the sheet, such that the printed microelectrodes are between the second side of the sheet and the flexible substrate.
9. The strain sensor of claim 8, wherein the strain sensor yields a negative gauge factor from about 15 to about 40.
10. The strain sensor of claim 1, wherein the spaced locations comprises locations which are spaced about 30 μm to about 1 cm from each other.
11. The strain sensor of claim 1, wherein the sheet is a buckypaper.
12. A method for measuring strain in a structure comprising:

subjecting the structure, which has at least one strain sensor according to claim 1 affixed thereon or integrated therein, to external forces effective to induce strain in the structure;

detecting a change in electrical resistance of the strain sensor, wherein the change is generated and transferred as an output voltage signal; and determining, from the output voltage signal, the strain in the structure caused by the external forces.

13. The method of claim 12, wherein the microelectrodes are printed at spaced locations directly onto the top side of the sheet, such that the sheet is between the printed microelectrodes and the flexible substrate.

14. The method of claim 13, wherein the strain sensor yields a positive gauge factor of about 6 to about 20.

15. The method of claim 12, wherein the microelectrodes are printed at spaced locations directly onto the side of the flexible substrate facing the opposing second side of the sheet, such that the printed microelectrodes are between the opposing second side of the sheet and the flexible substrate.

16. The method of claim 15, wherein the strain sensor yields a negative gauge factor of about 15 to about 40.

17. A method for making a strain sensor, the method comprising:

bonding a sheet comprising a carbon nanotube network to a flexible substrate, the sheet having a top side and an opposing second side; and printing two or more microelectrodes at spaced locations directly onto the top side of the sheet, wherein the sheet is arranged between the printed microelectrodes and the flexible substrate.

18. The method of claim 17, wherein the printing electrodes comprises aerosel jet printing of the electrodes.

19. The method of claim 17, wherein the spaced locations are spaced about 30 μm to about 1 cm from each other.

20. A method for making a strain sensor, the method comprising:

printing two or more microelectrodes at spaced locations directly onto a flexible substrate; and bonding a sheet comprising a carbon nanotube network to the flexible substrate, the sheet having a top side and an opposing second side, wherein the second side of the sheet is arranged atop or across the printed microelectrodes.

21. The method of claim 20, wherein the printing electrodes comprises aerosel jet printing of the electrodes.

22. The method of claim 20, wherein the spaced locations are spaced about 30 μm to about 1 cm from each other.

* * * * *